United States Patent [19]

Cartellone

[11] Patent Number: 5,360,170
[45] Date of Patent: Nov. 1, 1994

[54] CHOPPING ATTACHMENT FOR HAND HELD BLENDER

[75] Inventor: Mark Cartellone, Rocky River, Ohio

[73] Assignee: Mr. Coffee, Inc., Bedford Hts., Ohio

[21] Appl. No.: 110,096

[22] Filed: Aug. 20, 1993

[51] Int. Cl.$^5$ .................. A01D 55/00; A47J 42/00
[52] U.S. Cl. ..................... 241/169.1; 241/282.1
[58] Field of Search ............ 241/37.5, 92, 100, 169.1, 241/282.1, 282.2

[56] References Cited

U.S. PATENT DOCUMENTS

| | | | |
|---|---|---|---|
| 2,918,956 | 12/1959 | Otto | 241/282.1 X |
| 4,657,193 | 4/1987 | Whittenburg et al. | 241/282.1 |
| 5,129,589 | 7/1992 | Papaleo et al. | 241/37.5 |
| 5,156,084 | 10/1992 | Lin | 241/169.1 X |

*Primary Examiner*—Timothy V. Eley
*Attorney, Agent, or Firm*—D. Peter Hochberg; Mark Kusner; Michael Jaffe

[57] ABSTRACT

An attachment to a hand-held blender for chopping solids comprising a generally cylindrical receptacle having a closed lower end then an open upper end. The receptacle is generally symmetrical about a central axis and includes an elongated pin extending along such axis into the receptacle from the closed lower end. An elongated shaft having blade means at one end and attachment means at the other end is positionable on the pin for rotation thereabout. The shaft is freely rotatable on the pin with blades being positioned adjacent the closed lower end and the attachment member being positioned adjacent the open upper end. A coupling element having a first coupler for attachment to a rotatable member on the blender and a second coupler for attachment to the attachment member on the shaft is provided to transmit rotation of the rotatable member on the blender to the chopping member.

12 Claims, 4 Drawing Sheets

CHOPPING ATTACHMENT FOR HAND HELD BLENDER

FIELD OF INVENTION

The present invention relates generally to a chopping device, and more particularly to an attachment for a hand-held blender for chopping solids.

BACKGROUND OF THE INVENTION

In recent years, hand-held blending appliances, typically referred to as "stick-blenders," have become extremely popular for commercial and domestic use in the preparation of a wide variety of foods. Such appliances include an operative end which is immersible in fluid and has a rotatable blade which extends therefrom. Such appliances are generally used to blend or mix fluids such as gravies, broth or the like. To add to the versatility of such appliances, attachments are provided which enable the blender to whip liquids or to chop solids. The present invention relates to the latter-type attachment. The present invention provides an attachment to a hand-held blender for chopping solids which is easily attached to a stick blender and which includes a removable, rotatable chopping blade and means for preventing removal of the chopping blade during operation of the blender.

SUMMARY OF THE INVENTION

In accordance with the present invention, there is provided an attachment for a hand-held blender for chopping solids. The attachment includes a generally cylindrical receptacle which is symmetrical about a central axis and which includes a closed lower end and open upper end. An elongated pin aligned along the axis of the receptacle extends into the receptacle from the closed lower end. An elongated shaft is provided having blade means at one end and connecting means at the other end. The shaft is positionable in the receptacle on the pin to be coaxially aligned therewith and to rotate on the pin about the axis thereof. The shaft is freely rotatable on the pin with blade means being positioned adjacent to closed lower end and with the connecting means being positioned adjacent to the open upper end. A coupling element is provided and includes a first coupling means for attachment to a rotatable member on the blender and second coupling means for attachment to the connecting means on the shaft. The coupling element being rotatable within the receptacle with the rotatable member of the blender to impart such rotation to the chopping member.

It is an object of the present invention is to provide an attachment for a conventional stick blender for chopping and grinding solids.

Another object of the present invention is to provide an attachment which is described above wherein the attachment includes a container having a rotatable chopping element therein.

Another object of the present invention is to provide an attachment as described above including means for connecting the attachment to the blender wherein the chopping element is rotatable by a rotary element on the blender.

Another object of the present invention is to provide an attachment as described above having a container and a removable chopping element.

Another object of the present invention is to provide an attachment as defined above including means for permitting insertion and removal of the chopping element only when it is oriented in a predetermined position relative to the container.

These and other objects and advantages will become apparent from the following description of a preferred embodiment of the invention taken together with the accompanying drawings.

BRIEF DESCRIPTION OF DRAWINGS

The invention may take form in certain parts and arrangement of parts, an embodiment of which shall be described in detail in the specification, and illustrated in the accompanying drawings wherein.

DETAILED DESCRIPTION OF PREFERRED EMBODIMENT

Figure 1:
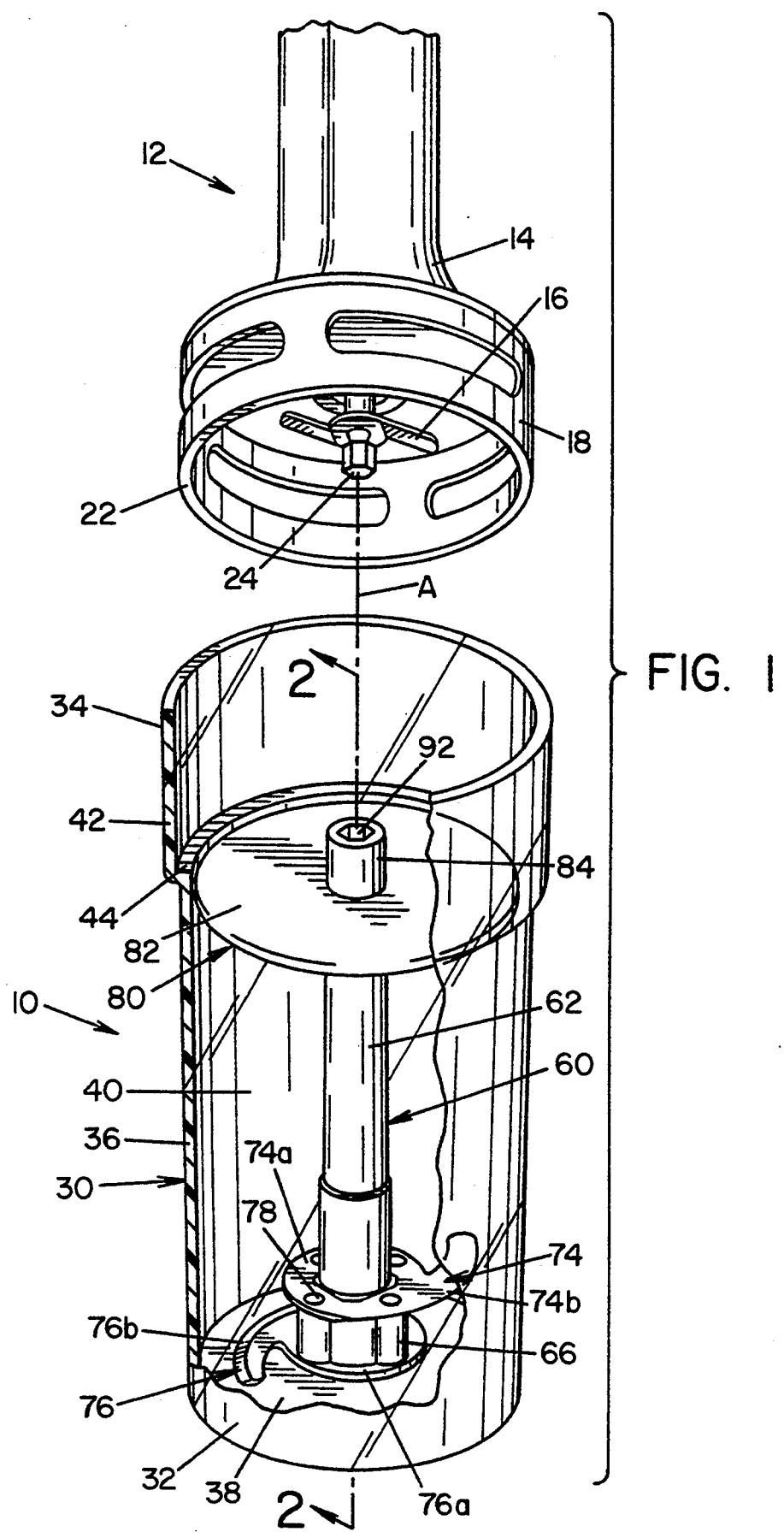
FIG. 1 is a partially broken perspective view of a chopping attachment for use with a hand-held blender illustrating a preferred embodiment of the present invention.

Referring now to the drawings wherein the showing is for the purpose of illustrating a preferred embodiment of the invention only, and not for the purpose of limiting same, FIG. 1 shows a chopping attachment 10, illustrating a preferred embodiment of the present invention. Attachment 10 is adapted for use with a stick blender, designated 12 in the drawings. Stick blender 12 in and of itself forms no part of the present invention, and therefore shall not be described in great detail. In general, conventional stick blenders typically include a lower end 14 which is immersible in fluid and which includes a rotatable blade 16 extending therefrom. A removable guard 18 is generally attachable to the lower end of the blender to surround blade 16. Guard 18 is generally cylindrical in shape and includes a planar lower end 22. In the embodiment shown, blender 12 includes a shaft extension 24 which in the embodiment shown is hexagonal in shape, and which is rotatable with blade 16.

Figure 2:
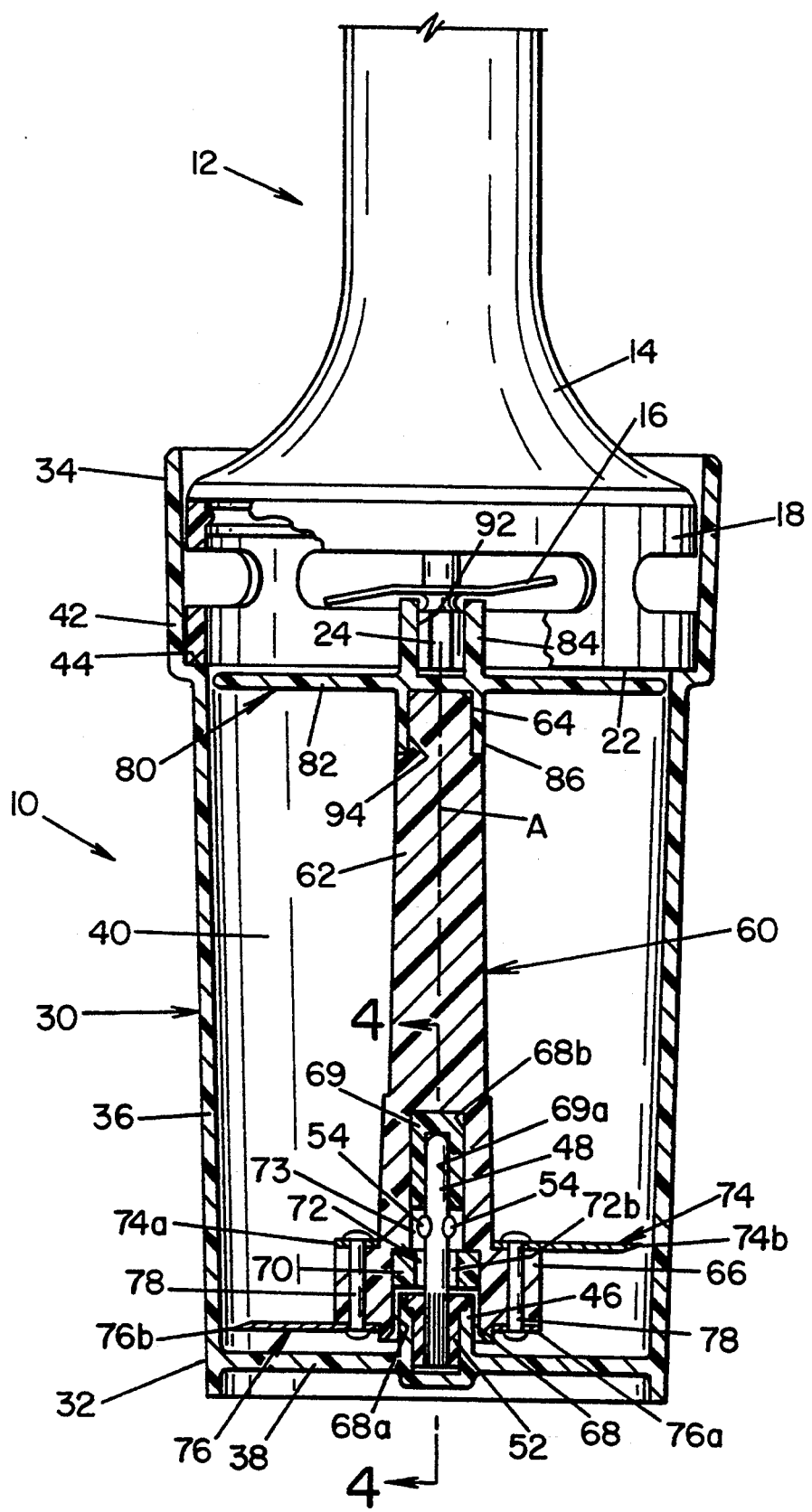
FIG. 2 is a sectional view taken along line 2—2 of FIG. 1.

Attachment 10 is generally comprised of a receptacle 30, a rotatable chopper 60, and a coupling member 80. In the embodiment shown, receptacle 30 is generally cylindrical in shape and is symmetrical about a central axis designated "A." Receptacle 30 includes a closed lower end 32 and an open upper end 34. A cylindrical side wall 36 and a bottom wall 38 define a generally cylindrical chopping chamber 40. The upper end of side wall 36 is formed to define a collar 42 of increased diameter and to define an annular shoulder 44 within receptacle 30 below collar 42, as best seen in FIG. 2. A centrally located cylindrical boss 46 extends upward from bottom wall 38. A cylindrical pin 48 aligned along axis A is mounted in boss 46. In the embodiment shown, pin 48 is embedded in a cylindrical plug 52 which is secured within boss 46 and extends slightly above the surface of boss 46. Pin 48 is preferably formed to have a rounded upper end and to include diametrically opposed and laterally extending wings 54. Wings 54 extend outward from the surface of pin 48 to define a non-cylindrical portion.

Figure 5:
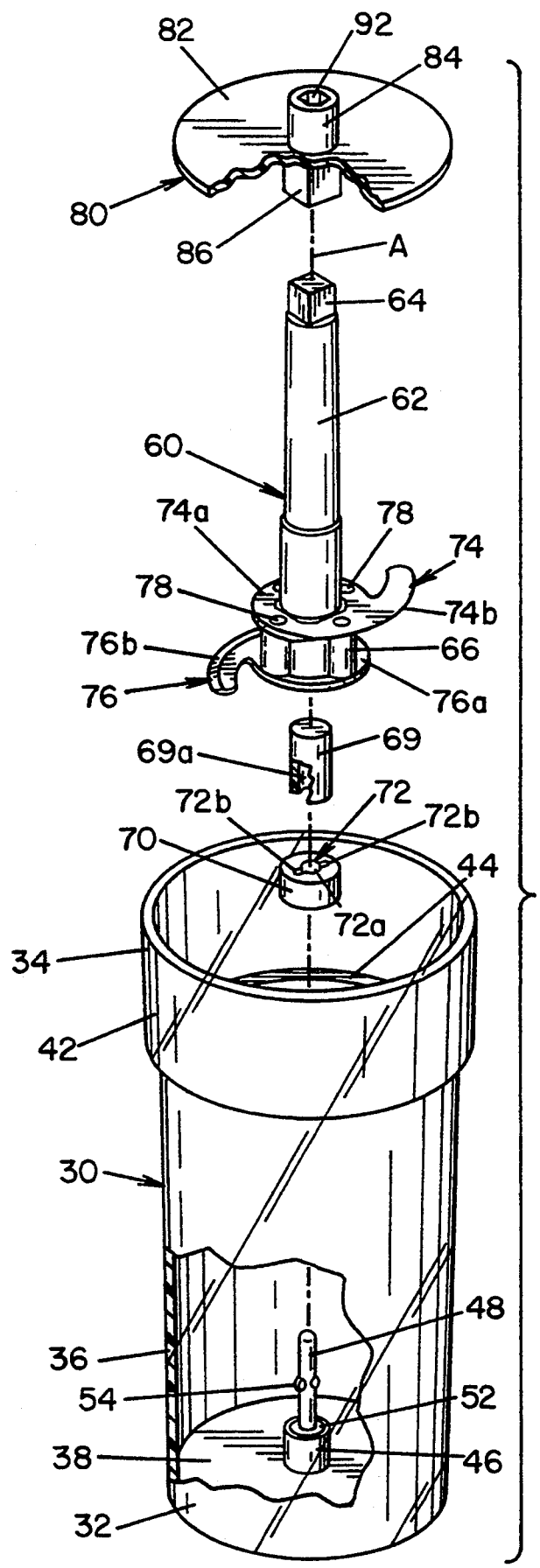
FIG. 5 is an exploded perspective view of the attachment shown in FIG. 1.

Chopping member 60 is generally comprised of an elongated shaft 62 which is generally symmetrical about a central axis. Shaft 62 has a shank 64 formed at the upper end thereof and an enlarged hub 66 formed at the lower end thereof. In the embodiment shown, shank 64 is generally rectangular in cross-section, as best illustrated in FIG. 5. An axially extending bore 68 is formed in the lower end of shaft 62. Bore 68 is comprised of two bore sections, i.e., a large outer bore section 68a, and smaller inner bore section 68b. Inner bore section 68b has an inner diameter slightly larger than the edge-to-edge dimension of wings 54 on pin 48.

Figure 3:
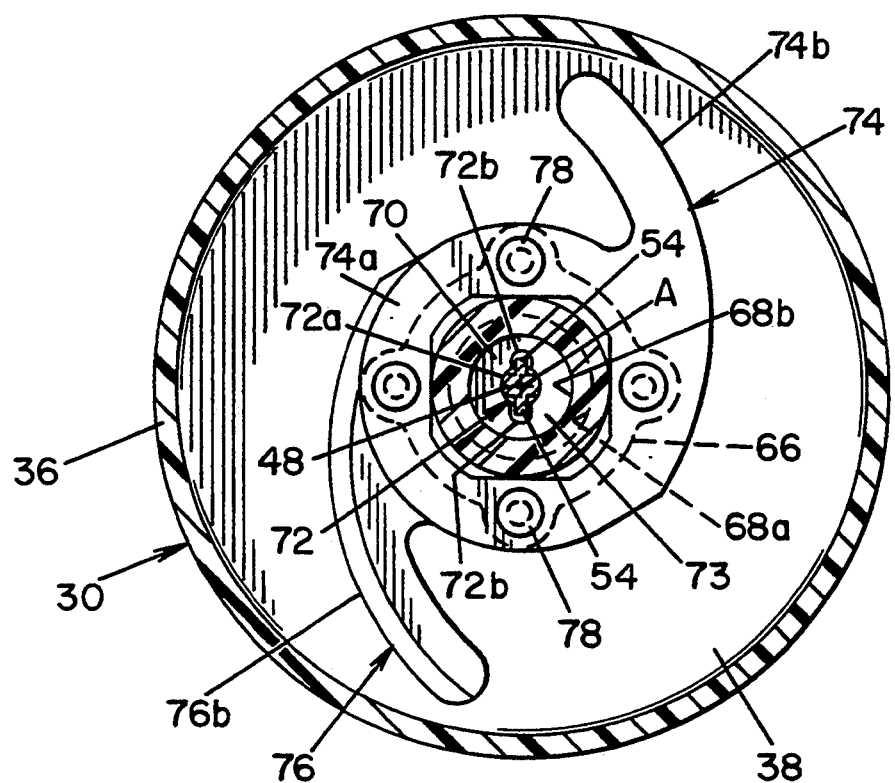
FIG. 3 is a sectional view taken along line 3—3 of FIG. 4.
Figure 4:
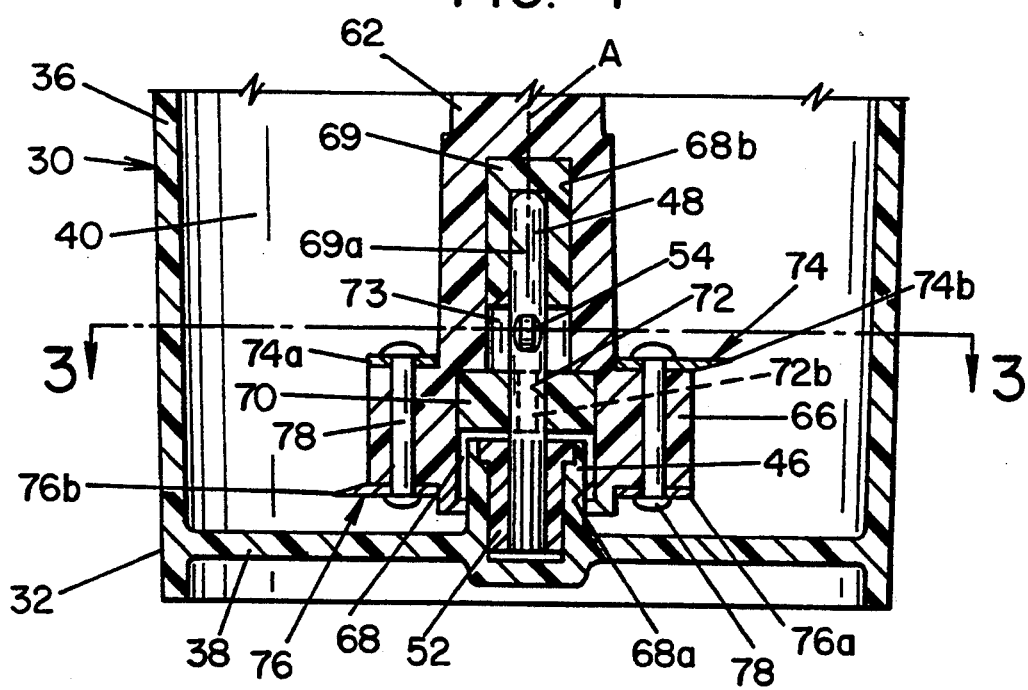
FIG. 4 is an enlarged sectional view of the lower end of the attachment shown in FIG. 1.

A second cylindrical insert 70 is provided to be inserted within outer bore section 68a. A first cylindrical insert 69 is provided to be inserted within inner bore section 68b. Insert 69 is preferably dimensioned to be press fit within inner bore section 68b so as to be secured therein. Insert 69 includes an axially-aligned central bore 69a dimensioned to receive the upper end of pin 48. Insert 70 is dimensioned to be press fit within outer bore section 68a to secure insert 70 therein. Insert 70 includes an axially aligned opening 72 (best seen in FIG. 3) having a central cylindrical portion 72a which is dimensioned to receive pin 48 therein, and diametrically opposed lateral slots 72b which are dimensioned to receive wings 54 on pin 48. Inserts 69 and 70 are dimensioned to be spaced apart and to define a cylindrical cavity 73. Pin 48 is dimensioned such that chopping member 60 rests thereon with wings 54 on pin 48 positioned within cavity 73, as seen in FIGS. 2 and 4.

Upper and lower chopping blade 74, 76 are mounted to hub 66 by rivet 78. Blades 74, 76 are generally identical and include an annular ring portion 74a, 76a and a blade portion 74b, 76b, respectively. Blades 74 and 76 are positioned on hub 66 such that blade portions 74b, 76b are diametrically opposed, as best seen in FIG. 3.

Coupling element 80 is generally comprised of a wall portion 82 having an upper sleeve 84 and a lower sleeve 86 extending therefrom. In the embodiment shown, wall portion 82 is generally comprised of a flat circular disc which is preferably dimensioned to be slightly smaller than the inner diameter of the opening defined by side wall 36 of receptacle 30. Upper sleeve 84 is generally cylindrical in shape and coaxially aligned with the axis of disc 82. Upper sleeve 84 includes a central bore 92, best seen in FIG. 1, which has a cross-sectional shape dimensioned to mate with and receive shaft extension 24 on blender 12. Lower sleeve 86 includes a bore 94 which is coaxially aligned with bore 92 and which is dimensioned to matingly and loosely receive shank 64 on shaft 62. In this respect wall portion 82 basically forms a lid or cover to chopping chamber 40 when positioned on shaft 62 of chopper 60.

In the embodiment shown, receptacle 30 is preferably formed of a clear plastic material to allow visual inspection of chamber 40. Chopping member 60 and coupling member 80 are also preferably formed of a plastic composition. Blades 74, 76 may be formed of a hard durable plastic material but are preferably formed of a metal. In the embodiment shown, receptacle 30, chopping member 60, except blade 74, 76 and coupling member 80 are formed of ABS. Other materials such as thermosetting resins, polyester, epoxyphenoic polypropylene, polystyrene, nylon, polycarbonates, and polyphenylene oxides may also be used.

Referring now to the operation of attachment 10, cutting element 60 is positioned on pin 48 of receptacle 30 by inserting pin 48 into opening 72 of insert 70. Rotating chopping member 60 will align wings 54 on pin 48 with slots 72b of insert 70. When wings 54 are aligned within slots 72b, chopping member 60 will then slide onto pin 48 until it rests upon pin 48, as best illustrated in FIG. 4. In this position, wings 54 are positioned within cavity 73, and chopping member 60 is freely rotatable on pin 48. In this respect, wings 54 on pin 48 and opening 72 of insert 70 basically define a key arrangement to enable chopping member 60 to be inserted on pin 48, only when chopping member 60 is oriented in a predetermined position relative to receptacle 30.

With chopping member 60 positioned on pin 48, the solid foods to be chopped may be inserted within chamber 40 of receptacle 30. Coupling element 80 is then positioned on chopping member 60 with lower sleeve 86 receiving and resting on shank 64 of shaft 62. As indicated above, wall portion 82 is preferably dimensioned to closely fit within the opening defined by side wall 36 and thus effectively form a cover for the solids within chamber 40.

The lower end 14 of blender 12 is then inserted within collar 42 of receptacle 30 with the planar lower end 22 of guard 18 resting upon shoulder 44 and with shaft extension 24 positioned within bore 92 of sleeve 84. In this position, rotation of the shaft of blender 12 imparts rotation to chopping member 60 by means of coupling member 80. In this respect, chopping member 60 is freely rotatable on pin 48 with wings 54 of pin 48 being within cavity 73 defined by inner bore section 68b. A few short bursts of blender 12 are generally sufficient to chop the foods within chamber 40 of receptacle 30. Once chopping member 60 has stopped rotating, blender 12 may be removed from receptacle 30. Coupling member 80 may then be removed from shank 64. By grasping the upper end of shaft 62 of chopping member 60 and twisting same while pulling it upward, wings 52 on pin 48 will eventually align with slots 72b in insert 70 to permit removal of chopping member 60 from receptacle 30.

Importantly, the design of attachment 10 reduces the likelihood of injury in the event that the user attempts to remove attachment 10 from blender 12 while blender 12 is still in operation. In this respect, the design of attachment 12 generally prevents chopping member 60 from being removed from receptacle 30 while it is rotating. In one respect, the loose attachment between coupling element 80 and shank 64 of shaft 62 would permit coupling element 80 to easily separate from chopping member 60 and not impart any axial force to chopping member 60 as blender 12 is moved away therefrom. This separation of coupling member 80 from chopping member 60 thus reduces the possibility of chopping member 60 being removed from receptacle 30 while still rotating. In another respect, because chopping member 60 can only be removed from pin 48 when slots 72b are aligned with wings 52 of pin 48, rotation of chopping element 60 on pin 48 effectively prevents such alignment. Consequently, the rotation of chopping member 60 prevents the alignment of wings 52 on pin 48 and slots 72b on chopping member 60, and thus essentially prevents removal of chopping member 60 from pin 48 while it is moving.

The present invention thus provides a simple and easy to use attachment 10 for a conventional stick blender which attachment 10 reduces the possibility of the chopping member 60 being removed from receptacle 30 while still rotating.

The present invention has been described with respect to a preferred embodiment. Modifications and alterations will occur to others upon the reading and understanding of the specification. It is intended that all such modifications and alterations be included insofar as they come within the scope of the patent as claimed or the equivalents thereof.

Having described the invention, the following is claimed:

1. An attachment to a hand-held blender for chopping solids comprising:
   a receptacle having a closed lower end and an open upper end, said receptacle being generally symmetrical about a central axis,
   an elongated pin extending along said axis into said receptacle from said closed lower end,
   an elongated shaft having blade means at one end and attachment means at the other end, said shaft being positionable on said pin in coaxial alignment therewith for rotation about the axis of said pin, said shaft being freely rotatable on said pin with said blade means positioned adjacent said closed lower end and said attachment means positioned adjacent said open upper end, and
   a coupling element comprised of a circular disc dimensioned to close the upper end of said receptacle, said coupling element having first coupling means on one side of said disc for attachment to a rotatable member on said blender and second coupling means on the other side of said disc for loose attachment to said attachment means on said shaft, said coupling element being rotatable with said rotatable member.

2. An attachment to a hand-held blender for chopping solids as defined in claim 1 wherein the open upper end of said receptacle includes a collar and an annular shoulder, said collar dimensioned to receive the lower end of a blender with the lower end resting on said shoulder.

3. An attachment to a hand-held blender for chopping solids comprising:
   a receptacle having a closed lower end and an open upper end, said receptacle being generally symmetrical about a central axis;
   an elongated pin extending along said axis into said receptacle from said closed lower end;
   an elongated shaft having blade means at one end and attachment means at the other end, said shaft being positionable on said pin in coaxial alignment therewith for rotation about the axis of said pin, said shaft being freely rotatable on said pin with said blade means positioned adjacent said closed lower end and said attachment means positioned adjacent said open upper end;
   a coupling element having first coupling means for attachment to a rotatable member on said blender and second coupling means for attachment to said attachment means on said shaft, said coupling element being rotatable with said rotatable member; and
   key means permitting placement or removal of said shaft on said pin only when said shaft is at a predetermined position relative to said pin.

4. An attachment to a hand-held blender for chopping solids as defined in claim 3 wherein said pin is generally cylindrical in shape and includes a laterally extending non-cylindrical portion, and said shaft includes an inner bore dimensioned to receive said non-cylindrical portion and an opening communicating with said bore, said opening dimensioned to permit said non-cylindrical portion to pass therethrough only when said shaft is in a predetermined position relative to said pin.

5. An attachment to a hand-held blender for chopping solids as defined in claim 4 wherein said non-cylindrical portion of said pin is comprised of diametrically opposed laterally extending wings.

6. An attachment to a hand-held blender for chopping solids as defined in claim 5 wherein said opening is a cylindrical bore.

7. An attachment for a blender comprising:
   a receptacle having an open end and a closed end, and defining a cavity therein;
   an elongated pin extending longitudinally from said closed end of said receptacle into said cavity along a predetermined axis, said pin having surface means extending laterally therefrom;
   chopping means mountable on said pin for rotation about the axis thereof, said chopping means having a first end and a second end, said second end of said chopping means having a first opening and a second opening formed therein, said openings being in alignment with each other and dimensioned to receive said pin when said chopping means is mounted thereon, said chopping means being rotatable about the axis of said pin when said surface means on said pin is within said second opening and being non-rotatable when said surface means on said pin is within said first opening; and
   coupling means for coupling said first end of said chopping means to a rotatable member of said blender.

8. An attachment to a hand-held blender for chopping solids as defined in claim 7 wherein said openings are cylindrical bores and said first opening is smaller than said second opening.

9. An attachment to a hand-held blender for chopping solids as defined in claim 8 wherein said surface means is a laterally projecting flange and said bore defining said first opening includes a laterally extending, axially aligned slot which is dimensioned to receive said flange on said pin and allow said flange to pass therethrough into said second opening when said chopping means is oriented in a predetermined position with respect to said pin.

10. An attachment to a hand-held blender for chopping solids as defined in claim 7 wherein the upper end of said receptacle defines an opening and said coupling means includes wall means dimensioned to enclose said opening in said receptacle when said coupling means is coupled to said chopping means.

11. An attachment to a hand-held blender for chopping solids as defined in claim 10 wherein said receptacle is generally cylindrical in shape and said coupling means is a circular disc having an upper surface with means for connection to said rotatable member of said blender, and having a lower surface with means for connection to said first end of said chopping means.

12. An attachment to a hand-held blender for chopping solids as defined in claim 10 wherein said chopping means is an elongated, generally cylindrical shaft having laterally extending blade means near said second end thereof.

* * * * *